United States Patent
Delort

(10) Patent No.: US 8,959,781 B2
(45) Date of Patent: Feb. 24, 2015

(54) METHOD AND DEVICE ENABLING MEASUREMENTS NECESSARY FOR MOUNTING LENSES AND ADJUSTING PRESCRIPTION EYEGLASSES FRAMES

(75) Inventor: Jean Marie Christophe Delort, La Seyne sur Mer (FR)

(73) Assignee: Experoptic SAS, Le Seyne sur Mer (FR)

( * ) Notice: Subject to any disclaimer, the term of this patent is extended or adjusted under 35 U.S.C. 154(b) by 464 days.

(21) Appl. No.: 13/511,064

(22) PCT Filed: Nov. 22, 2010

(86) PCT No.: PCT/FR2010/000778
§ 371 (c)(1),
(2), (4) Date: Feb. 5, 2013

(87) PCT Pub. No.: WO2011/067478
PCT Pub. Date: Jun. 9, 2011

(65) Prior Publication Data
US 2013/0125406 A1    May 23, 2013

(30) Foreign Application Priority Data

Nov. 24, 2009  (FR) ...................................... 09 05629

(51) Int. Cl.
*A61B 3/10* (2006.01)
*G02C 13/00* (2006.01)
(52) U.S. Cl.
CPC ............ *G02C 13/005* (2013.01); *G02C 13/003* (2013.01)
USPC .............................................. 33/200; 33/512
(58) Field of Classification Search
USPC ................ 33/200, 507, 512; 351/204; 705/80
See application file for complete search history.

(56) References Cited

U.S. PATENT DOCUMENTS

| 2,447,936 | A |   | 8/1948 | Ellis |
|-----------|---|---|--------|-------|
| 4,666,266 | A |   | 5/1987 | Morrison |
| 5,485,399 | A | * | 1/1996 | Saigo et al. .................... 351/178 |
| 5,812,234 | A |   | 9/1998 | Carswell |
| 5,973,772 | A | * | 10/1999 | Fukuma et al. ................. 33/200 |
| 6,381,012 | B1 | * | 4/2002 | Yancy ............................. 33/200 |

(Continued)

FOREIGN PATENT DOCUMENTS

| DE | 9403960 U1 | 8/1994 |
|----|-----------|--------|
| DE | 19752729 A1 | 6/1999 |
| EP | 2226672 A1 | 9/2010 |

(Continued)

OTHER PUBLICATIONS

International Search Report for corresponding International Application No. PCT/FR2010/000778.

*Primary Examiner* — G. Bradley Bennett
(74) *Attorney, Agent, or Firm* — Egbert Law Offices, PLLC

(57) ABSTRACT

A measuring device for creating prescription eyeglasses including a rigid eyeglasses template and a rhinometer. The template is made of a face part including two rims that are spaced apart and connected by a bridge. An earpiece is rigidly and removably attached to each side of the face part. The face part of the template is provided with a lining-up means that is precisely positioned on the outer surface of the face part. The rhinometer comprises two parts that are slidable against each other, each part having flanges comprising an angled edge. The angled edges of the flanges of one of the parts slant in an opposite manner to the flanges of the other part, each flange of one of said parts forming a pair of flanges with a flange of the other part, the spacing of said pair being variable so as to form a measuring device.

17 Claims, 7 Drawing Sheets

(56) References Cited

U.S. PATENT DOCUMENTS

| | | | |
|---|---|---|---|
| 7,296,357 B2 * | 11/2007 | Katzman | 33/200 |
| 8,333,469 B2 * | 12/2012 | Filipovich et al. | 351/159.01 |
| 2003/0081173 A1 | 5/2003 | Dreher | |
| 2003/0123026 A1 | 7/2003 | Abitbol et al. | |
| 2009/0273612 A1 | 11/2009 | Xie | |
| 2010/0198381 A1 * | 8/2010 | Feldman | 33/200 |
| 2011/0273666 A1 * | 11/2011 | Warden et al. | 351/204 |
| 2014/0152956 A1 * | 6/2014 | Silva et al. | 351/204 |

FOREIGN PATENT DOCUMENTS

| | | |
|---|---|---|
| FR | 2267736 A1 | 11/1975 |
| FR | 2497655 A1 | 7/1982 |
| NL | 84564 | 10/1956 |
| WO | 9815222 A1 | 4/1998 |
| WO | 0198862 A2 | 12/2001 |

* cited by examiner

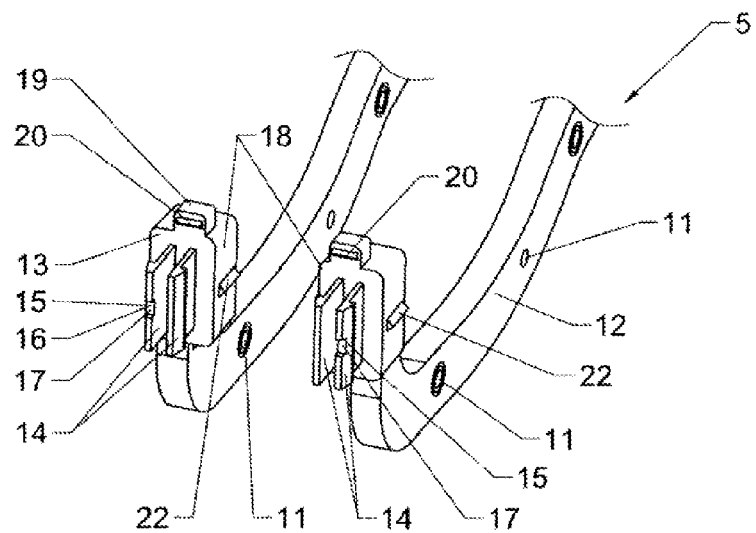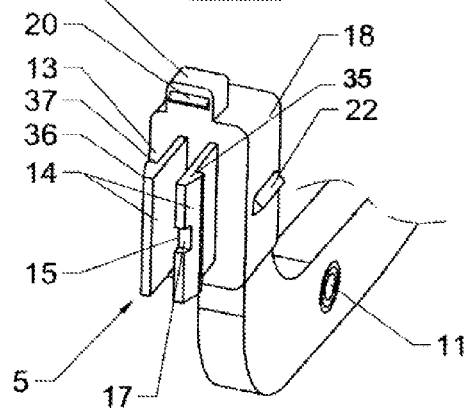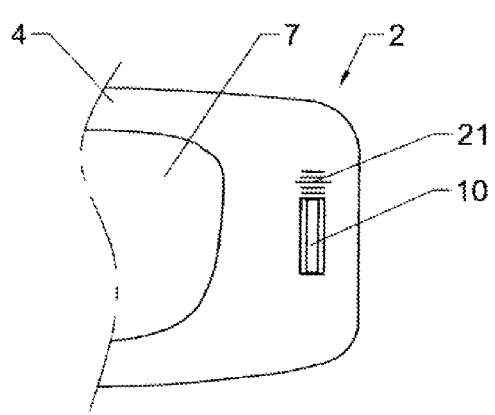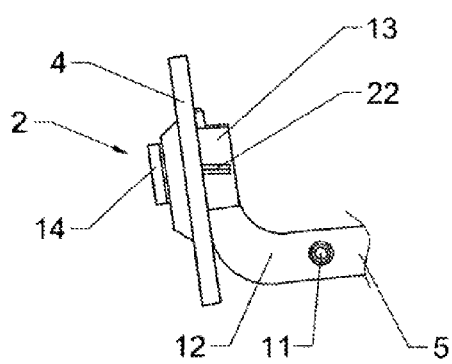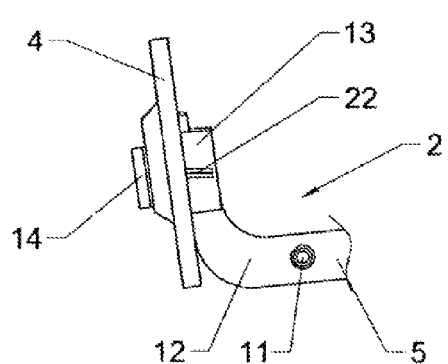

METHOD AND DEVICE ENABLING MEASUREMENTS NECESSARY FOR MOUNTING LENSES AND ADJUSTING PRESCRIPTION EYEGLASSES FRAMES

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention falls into the general category of sale and manufacture of eyeglasses. It concerns in particular a method and device for taking the necessary measurements for cutting and mounting the lenses, as well as the adjustment of the eyeglass frames without direct, physical contact between the wearer and the professional who will prepare the eyeglasses.

2. Description of Related Art Including Information Disclosed Under 37 CFR 1.97 and 37 CFR 1.98.

Usually the person experiencing vision problems goes to see an ophthalmologist to have his visual pathology and the relative remedies diagnosed. The ophthalmologist writes a prescription indicating the detected pathologies and, if applicable, a prescription for eyeglasses with lenses having the appropriate corrective optical characteristics.

The patient then takes the prescription to an optician in order to select a frame and to have corrective lenses put in, as prescribed by the ophthalmologist.

In order to prepare these corrective lenses and to put them into the selected frame, it is necessary to take some precise measurements.

These measurements permit the proper positioning of the lenses. At present they are taken, on the one hand, along an essentially horizontal axis, with pupillary distance rulers to determine the "interpupillary distances" of the client, and, on the other hand, along a vertical axis with a measuring tape to evaluate the height between the lower edge of the lenses in the frame selected by the wearer (having the frame on his nose at this time) and his visual axis in a so-called normal posture, this distance being commonly called "the pupillary height".

Once the correctives eyeglasses have been produced, the patient returns to the optician so that the eyeglasses can be adjusted, if necessary, to the shape of his face. This adjustment includes the setting of the pantoscopic angle (a term optical professionals are familiar with and which corresponds to the vertical tilt of the front of the frame when the wearer is looking at the horizon, in a natural posture, because, spontaneously we do not look at the horizon but at a virtual point on the ground located about ten meters in front of us), the opening of the tenons and the temples which will ensure the 'fit' of the frame on the wearer's head, the bend of the temples around the ears and the adjustment of the nose pads.

These efforts of preparation and production of the eyeglasses entail relatively high costs for the clients and for any social welfare organizations.

There exist however on telematics networks, such as the Internet, websites offering to fashion corrective eyeglasses which can be produced by providing the ophthalmologist's prescription and without having to go to an optician.

The sites offering this kind of service ask the patient to select the desired frame model, the color of the frame, the type of treatment of the desired lenses and to indicate the impairment of the right and of the left eye (sphere, cylinder, axis, addition) as stated on the prescription issued by the ophthalmologist.

Finally, the client must state precisely his or her pupillary distance, an indispensable value for the positioning of the lenses in the eyeglass frame; but this value which is rarely supplied during the visit at the ophthalmologist's office, is measured during the visit at the optician and remains most often unknown to the client.

Certain sites offer to contact the client, so that a professional may explain how to measure the pupillary distance. Other sites provide the client with a measuring kit (the VIKTORIN® method) in form of a free download that can be printed out.

Such a measuring kit is made of paper and may seem tedious to use. It is difficult for individuals to obtain precise measurements of the pupillary distance, all the more so as these persons are by nature "visually deficient".

Furthermore, accessible sites on the Internet offering these services are quite unable to perform the aforementioned adjustments that are traditionally made by the optician when the client comes to pick up his or her eyeglasses.

One is familiar, for example, with the document WO98/1522 which describes a template of optical glasses, made of cardboard, analog to an eyeglass frame, intended for the remote manufacture of eyeglasses. This template includes two spaced openings which are connected by a bridge, and two sliding temples at each lateral end of said template. Markings are distributed along the edges of its outside face and its temples. It includes also, on its outside face, slots for receiving sliding tabs that are configured for the measurements of the pupillary distance.

However, it is clear that the user who takes measurements of the pupillary distance with this kind of template with its numerous articulations will generally not be able to supply the precise values required for the manufacture of the eyeglasses. Utilization of this device takes a lot of time, is complex and tedious and may lead to errors in the interpretation of the pupillary distance. It should also be noted that this device very likely cannot be used by visually impaired persons, although it is intended for them, because they are asked to aim for a target located far away, through the eye of a needle.

And there is also the real technical difficulty for the printing and cardboard cutting industries to combine with precision, in large series production, printing and cutting. Whereas, looking for values in the order of a few tenths of millimeters is what is called for.

OBJECTIVE OF THE INVENTION

A first objective of the present invention is therefore to offer a device and a method for making it possible to order optical corrective eyeglasses presenting the required technical and aesthetic characteristics over the Internet, while enjoying the same benefits one expects from going to an optician.

Another objective of the present invention is to significantly reduce the generally very high cost of purchasing eyeglasses, without departing in any way from quality and precision requirements.

One of the aims of the present invention is also to enable the remote achievement of the measurements that are necessary for cutting the lenses and adjusting the frame.

BRIEF SUMMARY OF THE INVENTION

These objectives, as well as others which will become clear in what follows, are achieved thanks to a method enabling the remote production of eyeglasses by executing the following steps:

- Creation of a web site offering various eyeglasses, and in correlation these eyeglasses are being modeled in a computerized way in the manner of a 'tracing';
- Mailing by the owner of this web site, of an innovating measuring device to the client after said site has been consulted by the client, this measuring device includes an eyeglass template and a rhinometer;
- Taking of photographs, by the client, with the template placed on the nose, including a front view and a side-face (profile) view;
- Measurement of the width of the bridge of the nose and the angle of the nose flare using the rhinometer and direct reading of these values for making a model of the shape of the client's nose;
- Receipt, via Internet, of the order, photographs and various measurements taken directly by the client;
- Processing, by the website owner or under his control, utilizing software configured for enabling the analysis of the information transmitted by the client and of the instructions given for producing the eyeglasses in accordance with the selection and with the client's morphology;
- Production of the eyeglasses on the basis of the information resulting from this processing.

Therefore, this method fits advantageously into a precise protocol for the proper production of a pair of eyeglasses via Internet, while respecting not only their inherent technical characteristics but complying also with the selection as well as the morphological and aesthetic criteria of the client. More precisely, this method makes it possible, in particular, to determine the value of the pupillary distance (or of the two halves of the pupillary distance), a value which is indispensable for the production of a pair of eyeglasses. And then there is an appreciable advantage for the client, namely the final economical cost of this pair of eyeglasses.

According to an important characteristic disposition, the processing by the website owner or under his control, by means of the software, includes the following steps:

- Rescaling of the photographs of the client wearing the template, using the markings located in a predetermined manner on the face part and on the temples, said photographs featuring a front view and a side-face view;
- Determination of the precise value of the pupillary distance (or of the two halves of the pupillary distance) in relation to the virtual axis of symmetry of the template and of the measurement of the distance between the centers of the pupils derived from the markings of the face part of the template on the rescaled front view;
- Determination of the value of the optimal pupillary height by means of the front view and the side-face view including:
  - superposition of the tracing in the front view of the frame selected by the client onto the front view photo, these having been rescaled;
  - superposition of the tracing in the side-face view of the frame selected by the client onto the side-face view photo in order to confirm the proper position of the frame on the client's face, taking into account the position of the bridge of the selected frame in relation to the client's nose, the distances between the eye, the eyelashes and the lenses.
  - Evaluation of the value of the ideal pupillary height on the front view, this height corresponding to the distance between the bottom of the tracing of the frame and the pupillary axis;
- Determination of the opening to provide for the tenons and temples, on the basis of the information gathered on the photo of the face view that has been rescaled using the markings located on the face piece of the template, of the direction chosen by the client for the mounting of the temples of the template (position for a wide or narrow head) and of the total dimension of the template;
- Determination of the bend zone of the frame temples by using the side-face view that has been rescaled using the marking, of the tracing on the side-face view of the selected frame, of the distance between the bridge of the frame selected by the client and a particularly characteristic cartilaginous fold of the ear that is visible on the side-face view;
- Determination of the proper position of the nose pads including:
  - A reading of the distance between the bridge and the client's nose utilizing the side-face photo and the side-view tracing of the eyeglass frame selected by the client;
  - A progressive adjustment of the nose pads of the selected frame by positioning these eyeglasses on a 'false nose' with the same width of the bridge of the nose and same flare angle as the nose of the client.

The present invention concerns also a measuring device comprising a rigid template of eyeglasses for the implementation of this method. This template is remarkable in that it consists of a face part, analog to an eyeglass frame, comprising two spaced circles that are joined by a bridge, and on each side of which a rigid and removable temple has been attached or can be attached. Said face part of the template is provided with precisely positioned markings on the outside face of its two circles.

This rigid, removable eyeglass template which can be made of a light material, presents a rigid connection between the face part and the temples, and features the necessary means for calculating the value or the pupillary distance, as well as various means for remote proper adjustment of the final eyeglass frame. On the other hand, the eyeglass template, in the unassembled state, takes up very little space and can easily be shipped by mail.

According to an important characteristic of the invention, each side edge of the face part comprises an oblong opening that is configured to receive, in a rigid and removable way, the fastening end of a temple, the fastening end of each temple being shaped so that its permutation with the other temple is possible in order to modify the spacing of the temples, thus enabling an adaptation of the template to the morphology of the client's head (narrow head or wide head).

Therefore, since the temples are changeable from one oblong opening to another, they allow a better, remote adjustment, of an eyeglass frame to the morphology of the client.

According to yet another important characteristic of the invention, the fastening end of each of the temples features two rigid and flexible latching tabs positioned opposite each other to enable the flush fitting of the temples into the face part, each tab being provided with a head with a tapered end to facilitate bringing the tabs together as they pass into the oblong opening, and also with a large base in order to retain the head outside of the oblong opening.

Thus, the fastening end enables a rigid and perpendicular fit of the temples into the face part of the template. This arrangement is important because it guarantees proper parallelism of the face part of the template with a virtual line which would pass between the centers of the two pupils of the client and also the proper coherence of calibration distances derived from the template and the pupillary distances to be measured. Incidentally, such guarantees would be compromised by pliable templates, made for instance of cardboard or of stamped plastic sheeting.

According to yet another important characteristic, the pair of latching tabs of the fastening ends is eccentric relative to the plane in which each temple is included so that the space separating the two temples when these are fastened to the face part may be larger or less large or smaller or less small, depending on the position towards the right or towards the left that is occupied by each of the temples.

According to yet another characteristic arrangement one of the latching tabs of each fastening end of the temples has a notch the bottom of which contains a marking which is identifiable through said oblong opening in order to determine the position of a wide head or a narrow head of a client and [which is] directly visible on the front view.

According to yet another characteristic, the inside face of the face part comprises a number of parallel slots, preferably positioned above the oblong opening, these slots working together with an attachment feature provided in the upper part of the fastening end of the temples so that their position can be indexed upward or downward, considering a vertical position of the eyeglass template worn by the client, the height of the temples being locatable through the oblong opening of said face part.

This disposition allows evaluating the possible vertical variation of one ear relative to the other, and of one individual relative to another, which is useful for the final adjustment of the eyeglass frame.

Advantageously, the outside and the inside faces of the two temples are provided with marking means that are distributed over their entire length or at least over the rear portion of said temples.

According to an important characteristic the marking means consist of targets placed at a precise and predetermined distance from each other.

According to another important characteristic, each temple includes, in its connecting portion to the facial part of the template, a downwardly oriented horizontal displacement whereby a large part of the face area can be uncovered so that the essential characteristics of the eye and its surroundings can be made visible.

This essential characteristic, combined with the low encumbrance of the fastening system on the facial part allows a good view of the eye, eyelid, superciliary arch, bridge of the nose and its juncture with the profile of the forehead.

According to another characteristic of the invention, each temple comprises, in its connecting portion to the face part of the template, a marking which is in alignment of the lower straight edge of the temple in contact with the ear of the client.

The measuring device involves also a rhinometer for the implementation of the method according to the invention.

Rhinometers exist in various types. According to the invention, an original rhinometer is provided that is remarkable in that it features two parts that can slide one against the other, each of these parts having flanges featuring a sloped edge, the sloped edges of one of the parts having an inverse inclination to that of the flanges of the other part, each flange of one of said parts forming with one flange of the other part a couple of flanges whose spacing is variable and whose sloped edges form between them a variable angle so as to constitute a device enabling the measurement of the angle of flare of the nose as well as the bridge of the nose.

According to an important characteristic of the invention, the rhinometer features means making it possible, on the one hand, to maintain the parts lying flat one against the other and, on the other hand, enabling the guidance of these parts during their reciprocal axial movements.

According to another important characteristic, the rhinometer features a back part and a face part. According to the invention, the back piece features on its front face a diagonal line that can be traced through a diagonal slot in the face part, the diagonal slot having markings on its sides which constitute a measuring system.

Depending on the spacing of one part relative to the other, this arrangement will provide the value of the flare angle of the nose and the value of the width of the bridge of the nose, simply by reading on the graduated slot in front of the thin, visible portion of the diagonal line in this slot.

According to another important characteristic of the invention, the rhinometer features a number of couples of flanges in its upper and its lower part, each of these couples of flanges having a different angular value, so as to form a number of average measurements of the flare angle of the nose and of the width of the bridge of the client's nose.

This rhinometer is advantageous in this sense that its utilization by any person is extremely easy and it is inexpensive and lets one take a direct reading of the flare angle of the nose and of the width of the bridge of the nose at the exact place where the nose pads will be positioned, and this as a complement of all measurements already obtained with the eyeglass template.

The present invention refers further to eyeglasses produced by implementing the method and the measuring device according to the characteristics described above.

BRIEF DESCRIPTION OF THE DRAWINGS

The above aims, characteristics and advantages and still more will become clearer from the detailed description which follows and the attached drawings in which:

FIG. 9 is a partial and enlarged perspective view of the ends of the two temples of the eyeglass template.

FIG. 10 is a partial and enlarged perspective view of one end of one temple of the eyeglass template.

FIG. 11 is a partial and detailed perspective view of one side of the inside face of the face part of the eyeglass template.

FIG. 12 illustrates a partial side view of the eyeglass template with the temples in high position.

FIG. 13 is an analog view to FIG. 12 illustrating the temples of the template in low position.

DETAILED DESCRIPTION OF THE INVENTION

Reference is made to said drawings to describe an interesting, although by no means limiting example of production of a measuring device and of the method of implementation according to the invention.

In the following disclosure and the claims, the term 'eyeglasses' designates more specifically eyeglasses which are constituted by a frame equipped with corrective lenses for the purpose of remedying a vision deficiency; by extension, it applies to any type of eyeglasses, including sunglasses with or without corrective lenses.

Likewise, in the present description, words are used such as 'upper', 'lower', 'lateral', with reference to the position of the template when it is placed on a face, like a classic pair of eyeglasses.

On the other hand, the expression, 'outside face' designates the visible face of the template when it is positioned on the patient's face, the 'inside face' designates the face that is opposite to the 'outside face'. The patient will likewise be called "client" in the description and the claims.

The Measuring Device or Measuring Kit

The invention concerns a measuring devise or measuring kit 1 including two rigid, light and precise elements thanks to which it is possible to recover, by means of two photographs and one account of direct reading, the necessary and sufficient dimensions and information to enable, on the one hand, the complete adjustment of an eyeglass frame on the face of a client, and, on the other hand, the centering of the corrective lenses after having previously determined the correction of the visual deficiencies of the client.

Figure 1:
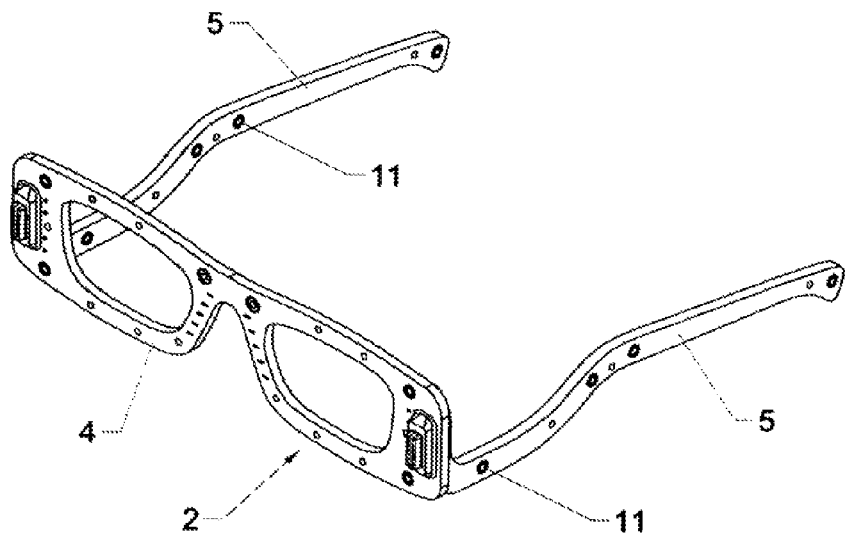
FIG. 1 is a perspective view illustrating the eyeglass template according to the invention.
Figure 2:
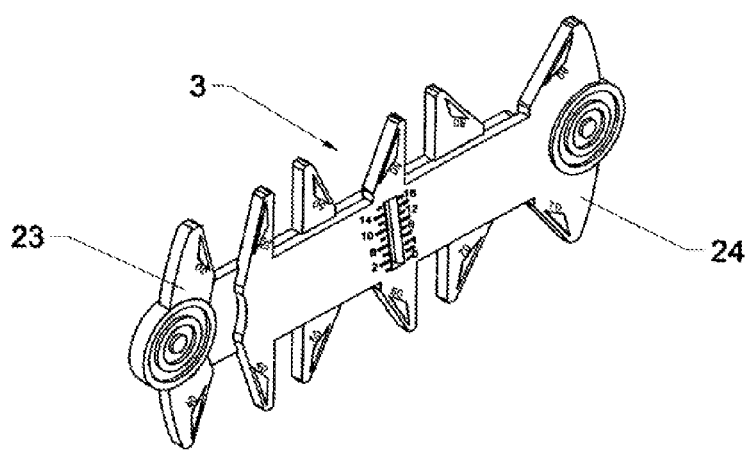
FIG. 2 is a perspective view illustrating the rhinometer according to the invention.

These two elements are constituted by a rigid template 2 of optical eyeglasses, illustrated on FIG. 1, analog to an eyeglass frame, and by a rhinometer 3, illustrated on FIG. 2. These elements are especially designed to enable the remote ordering and sale of eyeglasses, in particular via Internet.

The Eyeglass Template

In an advantageous but not limiting manner the eyeglass template 2 is made of rigid or semi-rigid injected plastic. It is demountable and light so that it can easily be mailed.

Figure 3:
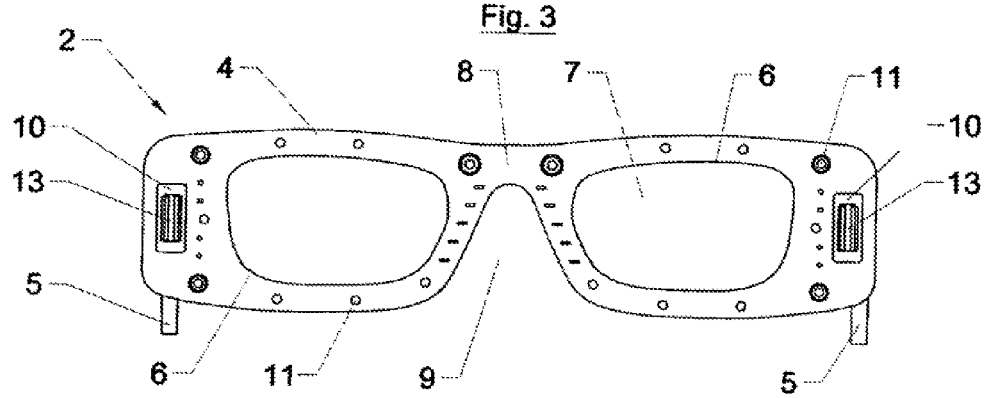
FIG. 3 is a front view of the eyeglass template.

The eyeglass frame 2, as can be seen on FIGS. 1 and 3, is constituted by a face part 4 and two removable temples 5. The face part 4 of the template 2 features preferably an essentially rectangular shape of constant thickness and comprises, on both sides of its center line, two parts or "circles" 6 that are spaced and connected by a bridge 8.

This face part 4 features, in its lower median part, a notch 9 so that the template 2 can be placed on the nose of a subject. More precisely, the bridge 8 of the face part 4 is shaped so it can straddle the client's nose.

Each circle 6 delimits an opening 7 which may present an essentially trapezoidal shape so that on a front view photograph for instance one distinguishes the eyelid fold of the patient. However, the circles 6 may present an elliptical shape or any other shape delimiting a sufficiently large opening 7 to perceive the eyes and their various characteristics.

Advantageously, the upper edge of the face part 4 is rectilinear. However, this edge could alternatively present a curvilinear shape.

According to an important characteristic disposition of the invention, the face part 4 of the template 2 is provided with markings 11 that are precisely positioned on the outside surface of its two circles 6.

According to another characteristic disposition of the invention, each lateral edge of the face part 4 comprises a vertical oblong opening 10 that is shaped to receive and retain a temple 5. The temples 5 are essentially of constant thickness and are meant to be placed on the patient's ears. Advantageously, they become slightly thinner towards the connecting portion to be rigid, supple and elastic at the same time.

The temples 5 joined, in a rigid and removable manner, to the face part 4 by means of their end 13 hereafter called the "fastening end". This end 13 is, according to the illustrated example, equipped with two latching tabs 14 positioned one opposite the other. More precisely, each of the tabs 14 has a tip 35 with a tapered end to facilitate the insertion and the approach of the tabs 14 during their passage in the oblong opening 10. These tips 35 feature also a large base 37 which constitute a means of retaining the tip 35 outside of the oblong opening 10. Since the tabs 14 are rigid and flexible the temples 5 can clip and embed themselves in the oblong opening 10 of the face part 4 so as to guarantee on the one hand, a rigid connection between the temples 5 and the face part 4, and, on the other hand, a parallelism between the face part 4 of the eyeglass frame 2 and a virtual line which passes through the pupils of the client.

Advantageously the Opening 10 is of Rectangular Shape.

The opening 10 could however have another shape, for example quadrangular, circular, oval, etc.

Figure 4:
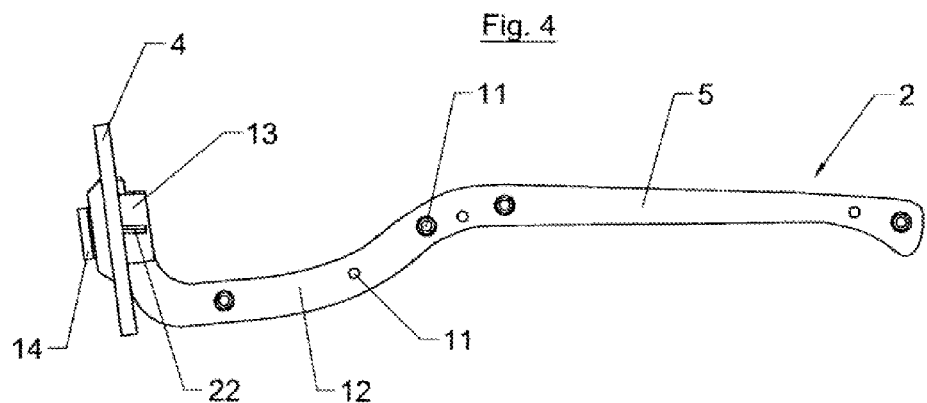
FIG. 4 is a side view of the eyeglass template.

According to an advantageous characteristic illustrated in FIG. 4, the outside face of each of the temples 5 is also provided with markings 11 that are precisely and regularly distributed or not on at least one rear portion of its length.

Preferably, the markings 11 are distributed over the entire surface of the two inside and outside faces of the temples 5, so as to always leave the markings 11 visible in front of and behind the client's ears.

Figure 5:
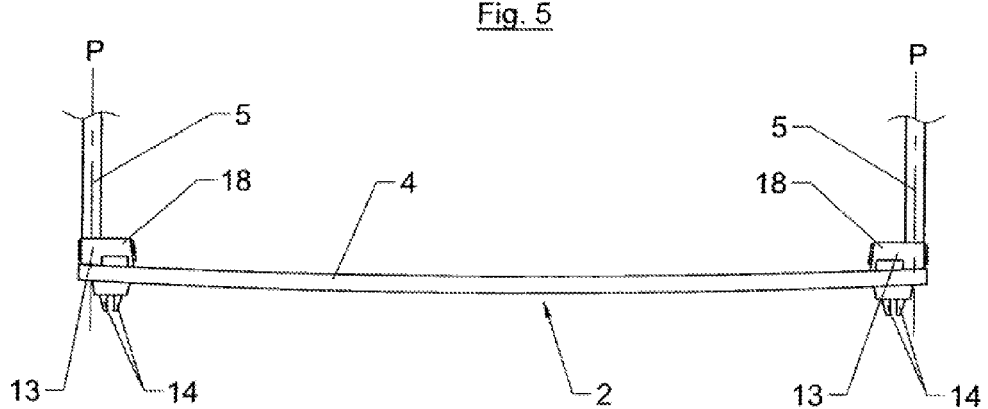
FIG. 5 is a top view of the eyeglass template illustrating the temples in a wide head position.
Figure 6:
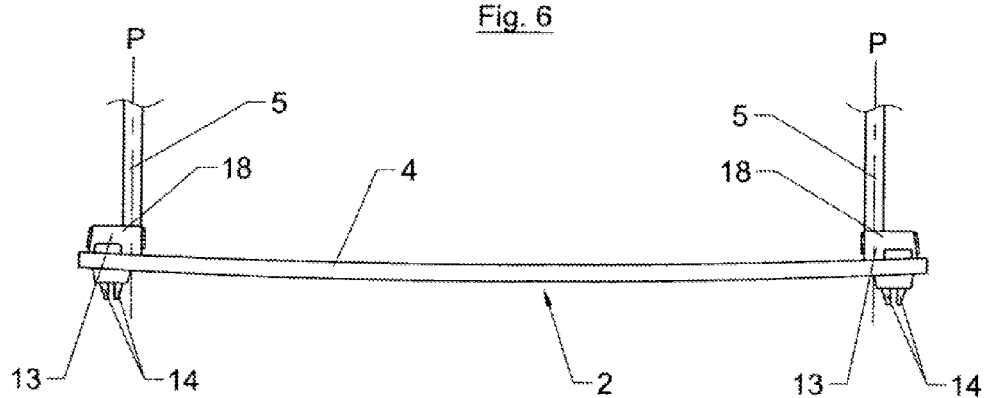
FIG. 6 is an analog view to FIG. 5 illustrating the temples in a narrow head position.

According to another characteristic of the invention, the temples 5, and in particular their fastening ends 13 in conjunction with the vertical oblong opening 10 of the face part 4, are shaped so as to enable their permutation (right or left) to the other (left or right). Thanks to this arrangement, the eyeglass frame 2 can be adapted to the head of a subject, depending on whether he or she has a "wide" or a "narrow" head. To enable this adaptation the axis of the fastening end 13 of the temples 5 which is intended to embed itself in one of the oblong openings 10 of the face part 4 features a shoulder 18 with the couple of latching tabs 14. This couple of latching tabs 14 is eccentric relative to the plane P in which the temple 5 is included. Thanks to this offset or displacement the space separating the two temples 5 when they are fastened to the face part 4 can be more or less large or small, depending on the position to the right or to the left occupied by each of the temples 5. The space between the temples 5 is thus larger when these are in the wide-head position and smaller when the temples 5 are in the narrow-head position (see FIGS. 5 and 6).

Incidentally, one of the tabs 14 of the fastening end 13 of the temples 5 is provided with a notch 15 the bottom 16 of which presents a mark 17 (see FIGS. 9 and 10) which can be easily detected and identified through the opening 10 of the face part 4 of the template 2 and which consequently makes it possible to identify the mounting direction of the temples 5 for a wide head or a narrow head, directly on the front view. This arrangement appears to be a major precision for the final adjustment of the frame.

According to another characteristic of the invention illustrated in FIGS. 9 to 13, the upper part 19 of the fastening end 13 of the connecting portion of the temples 5 is equipped with a tab 20 that is meant to embed itself in one of the slots of a number of horizontal and parallel slots provided in the inside face of the face part 4 of the template 2, above the oblong opening 10. This arrangement enables an indexation of the temples 5 upward or downward, in view of a vertical position of the eyeglass template worn by the client. This arrangement is advantageous in so far as it allows taking into account any differences in the height of one ear relative to the other and for each individual. The client will adjust for instance the template 2 on his face so as to make it properly perpendicular to his face, by vertically displacing one or the other of the temples 5 and by ensuring that the template 2 sits properly on the nose and the two ears.

Figure 7:
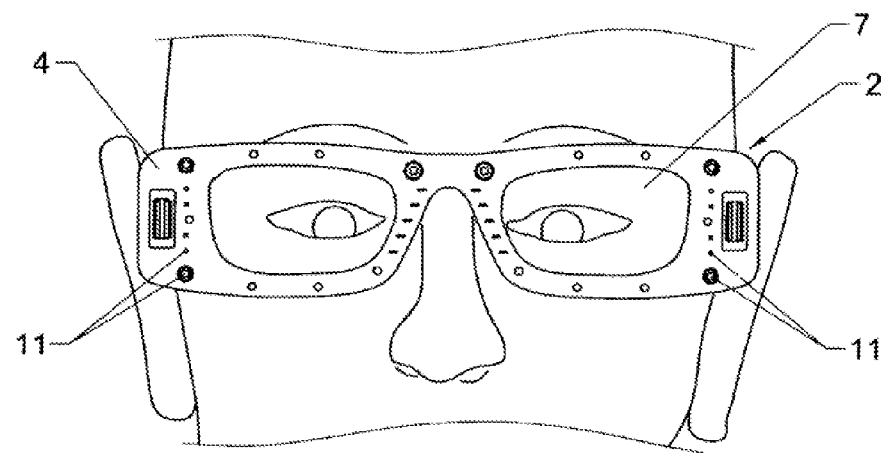
FIG. 7 is a front view of the eyeglass template positioned on the head of a client.

The height position of the temples 5 can be identified and located through the oblong openings 10 of the face part 4 and on the front view as illustrated for instance on FIG. 7, thus making it possible to evaluate the adjustment to be made for the final eyeglass frame.

Advantageously, the tab 20 of the connecting portion of the temples 5 presents a triangular section, a thickness in the order of 2 to 5 mm, and a height in the order of 3 to 10 mm, which allows it to be inserted without any noticeable play in one of the slots 21. However, this tab 20 may have a quadrangular shape, for example.

Of course, the number of slots 21 could be located below or on the sides of the oblong opening 10.

According to an important characteristic of the invention the markings 1 are constituted by targets placed at a precise and predetermined distance from each other. More precisely, these targets are constituted by circles and their positioning is fixed, extremely precise and not modifiable. They must be sufficiently large and visible, for example in the form of a dot so as to permit a correct interpretation of the data during the rescaling of the photographic views by means of computer-assisted design software. These targets are plotted through engraving or printing on the various faces concerned of the eyeglass template.

Figure 8:
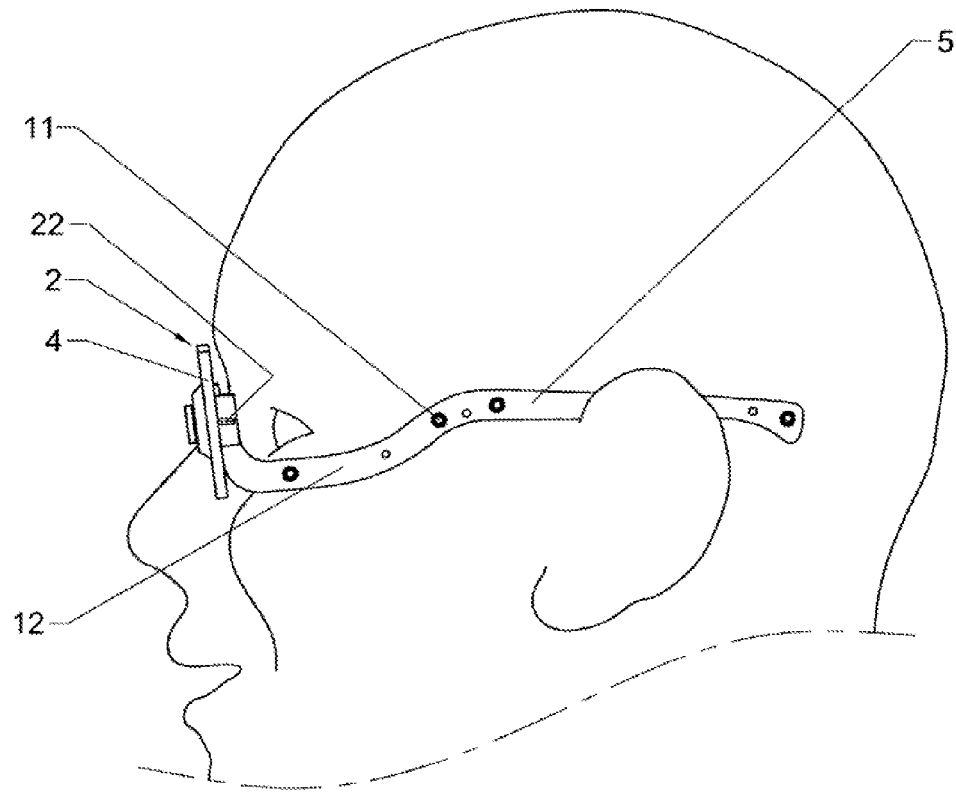
FIG. 8 is a side view of FIG. 7.
Figure 14:
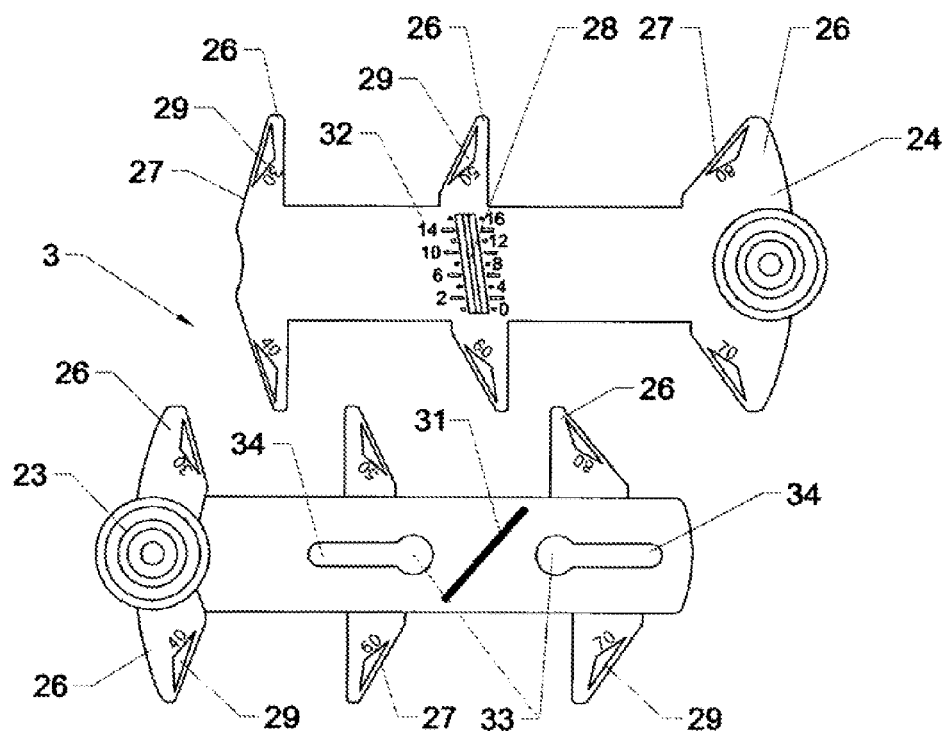
FIG. 14 is an exploded front view of the rhinometer consisting of two parts.
Figure 15:
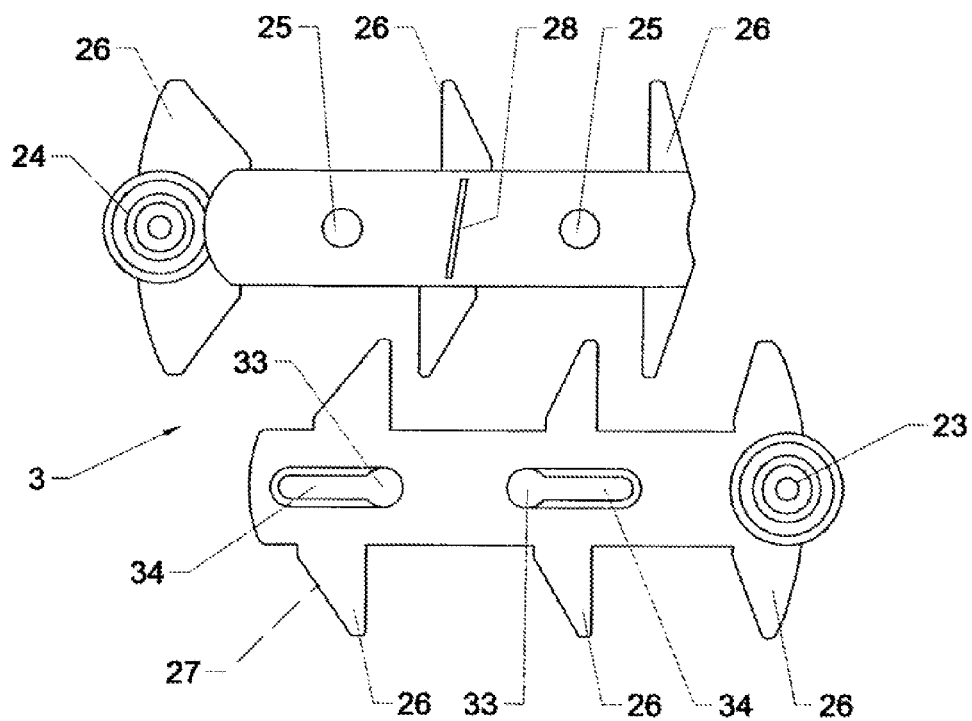
FIG. 15 is an exploded rear view of the rhinometer consisting of two parts.
Figure 16:
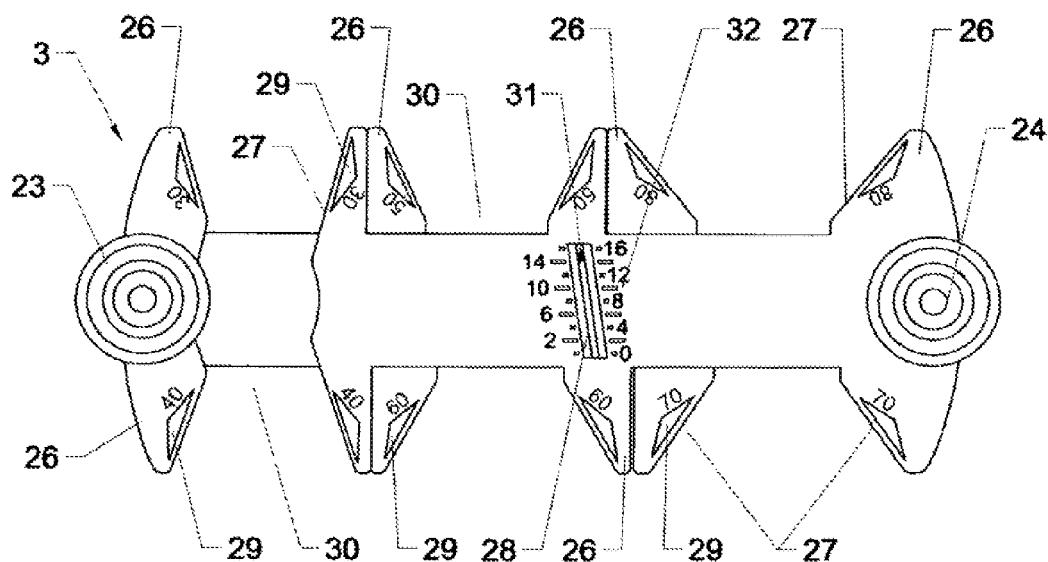
FIG. 16 is a front view of the rhinometer in the position of maximum opening.
Figure 17:
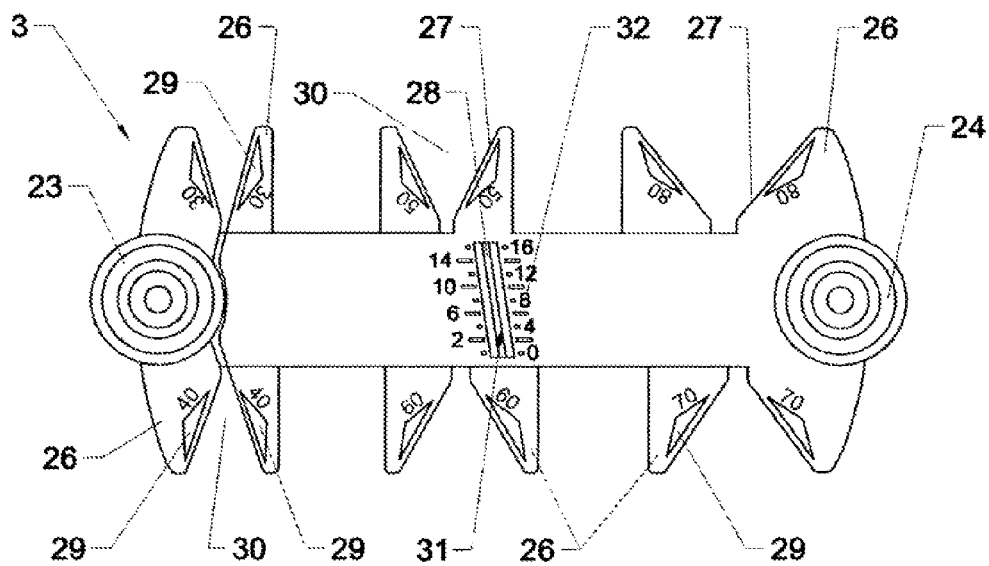
FIG. 17 is a front view of the rhinometer in the position of minimum opening.
Figure 18:
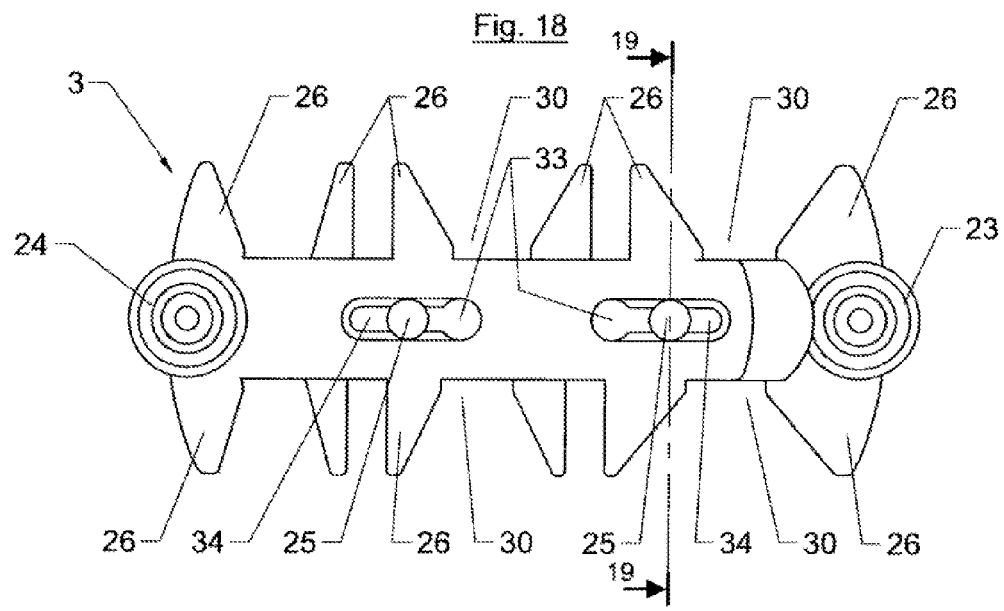
FIG. 18 is a rear view of FIG. 17.
Figure 19:
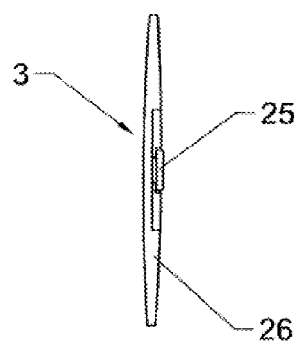
FIG. 19 is a section view along line 19-19 of FIG. 18.

According to yet another advantageous characteristic of the invention, illustrated on FIGS. 4 and 8, the temple 5 comprises, in its connecting portion to the face part of the template 2, a deep horizontal displacement 12 in the downward direction which makes it possible to uncover a large part of the face area to make visible the essential characteristics of the eye and its surroundings. By giving the temple 5 this particular profile, it is possible to particularly evaluate, with no obstruction, the recess of the eyes, the thickness of the eyelids, the height of the superciliary arch, the length of the eyelashes etc., so many personal characteristics of each individual. Also, since the upper part of the face is unobstructed thanks to this horizontal displacement 12, it is possible to reconstitute the line from the forehead and its juncture with the bridge of the nose.

It is also possible to define the axis of the client's pupils relative to the temple 5 of the template 2 with the help of a marking 22 placed in the exact alignment of the lower rectilinear edge of the temple 5 in contact with the client's ear. This marking 22 can be useful for the adjustment of the pantoscopic angle. On the other hand, thanks to the particular profile of the temples 5, the template 2 makes it possible to adjust, remotely, the opening of the temples of the final eyeglass frame, of the height of the tenons and of the bending of the temples at the proper place around the ears (auricular cartilage).

All these observations are essential for achieving a proper, personalized adjustment of the eyeglass frame.

The Rhinometer

According to an important characteristic disposition, the measuring device 1 includes, as previously indicated, a rhinometer 3.

According to the invention, this rhinometer 3 illustrated, more precisely, on FIGS. 14 to 19, is constituted of two parts 23, 24 which slide one against the other by means of their plane surface. The parts 23, 24 are constituted, for example, by a back part 23 and a front part 24. There are means which permit, on the one hand, to maintain the parts 23, 24 pressed one against the other and, on the other hand, their guidance during their reciprocal axial movements.

According to the example shown, the parts 23, 24 are kept together by two guide pins 25 placed on the front face of the back part 23. These guide pins 25 slide, respectively, along two elongated openings 34, made in the front part 24 and comprising at one of their ends, a circular portion 33 through which these guide pins have been inserted. The circular portions 33 comprise essentially the same diameter as the guide pins 25 so as to enable the insertion of the latter through the elongated openings 34.

Figure 20:
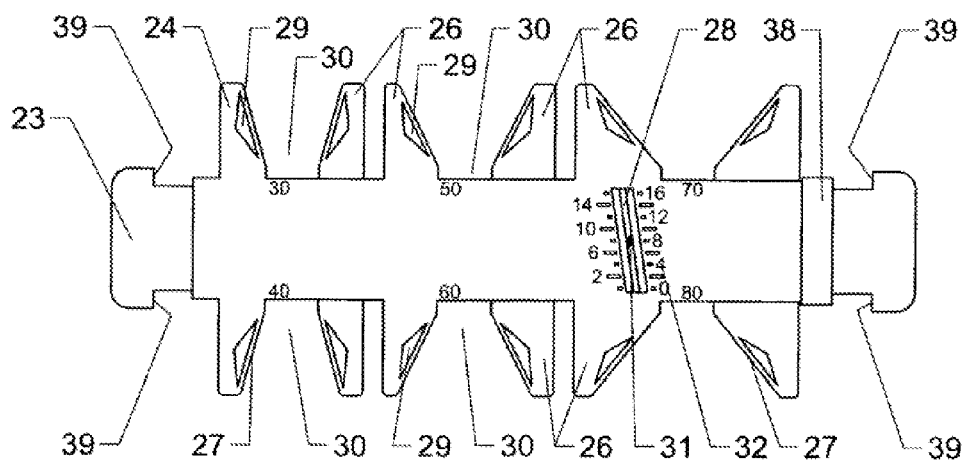
FIG. 20 illustrates another way of producing the rhinometer according to the invention.

According to another way of production, illustrated on FIG. 20, the holding means of parts 23, 24 of the rhinometer 3 are constituted by a ring or collar 38 that can be placed around the adjacent end portions of the parts 23, 24, these rings or collars 38 which serve to guide the sliding parts 23, 24. To this effect the latter are provided, at one of their ends, with a stop 39 working together with the adjacent ring or collar 38, to prevent a disconnection of parts 23, 24.

Each part 23, 24 is provided with flanges 26 featuring a slanted edge 27. The slanted edges of the flanges 26 of one of the parts 23, 24 have an inverse inclination of that of the flanges 26 of the other part 24, 23. Each flange 26 of one of said parts 23, 24 forms with one flange 26 of the other part 24, 23 a couple of flanges 26 the spacing 30 of which is variable through reciprocal sliding of parts 23, 24 and their slanted edges 27 form between them a variable angle so as to constitute a device for measuring the flare angle of the nose and the width of the bridge of the client's nose.

When the device is assembled, the slanted edge 27 of each flange 26, of the back part 23 for example, is judiciously positioned opposite the slanted edge with the same slant of the front part 24 of the rhinometer 3.

The flanges 26 are provided with markings 29 placed on their slanted edges 27 and make it possible to determine the flare angle of the client's nose.

According to the invention, the back part 23 features on its front face a diagonal line 31 that is very judiciously positioned and visible through a diagonal slot 28 of the face part 24, the diagonal slot 28 is inversely oriented relative to the diagonal line 31 and has markings 32 on its sides which constitute a measuring system. Depending on the position of one part 23, 24 in relation to the other part 24, 23, and hence of the flanges 26 of each couple of flanges 26 of angle measurements, this arrangement makes it possible to obtain the value of the width of the client's nose bridge by a simple direct reading through the slot 28 with associated markings 32 which affords the visibility of a thin portion of the diagonal line 31.

These markings 32 consist of the graduations of any measuring system, such as for example the metric system, the Anglo-Saxon measuring system or any other measuring system.

The slot 28 with its associated markings could be placed vertically relative to the face part 24.

Each part 23, 24 is provided with a number of flanges 26 extending from its upper edge, and a number of flanges 26 extending from its lower edge.

According to the example shown, the rhinometer 3 features six couples of flanges 26 (three in the upper part and three in the lower part), so as to form a number of means for measuring the flare angle and the width of the nose bridge of the client. For this purpose the inclination of the slanted edges 27 of the flanges 26 of each couple is different from the inclination of the slanted edges 27 of the flanges 26 of the other couples. Each of these couples of flanges 26 is provided to measure a specific angle value, for example 30°, 40°, 50°, 60°, 70°, 80° which provides a wide range of possible measurements.

This rhinometer 3 makes it possible to determine at the same time the flare angle of the nose as well as of the nose bridge of the client. Knowledge of these two values, angle and width of the bridge will then enable the precise adjustment of the nose pads. More precisely, it makes it possible to perform a direct and precise reading at the exact location where the nose pads of the eyeglass frame will position themselves when it is in use.

As far as taking the measurements with the rhinometer 3 is concerned, the client will advantageously get the help of the third person to place the rhinometer on his nose, perpendicularly to the line of the nose (seen in profile) and closest to the juncture of the nose with the forehead. It will then be necessary to choose the flare angle that corresponds best to the client's nose and to carefully slide the parts 23, 24 so as to establish a contact between the nose and the slanted edges 27, and between the bridge of the nose and the central portion of the rhinometer 3. The flanges 26 will touch the nose at the exact place where the nose pads of the eyeglass frame will eventually rest, after adjustment. Since this positioning is being done on the nose of the subject, it suffices to directly read the flare angle and the bridge width in the graduation (marking 32) of the slot 28.

This rhinometer 3 may be made of any adequate material such as cardboard, stamped or injected plastic etc.

The Method

The invention concerns also a method for the remote production of eyeglasses thanks in particular to the characteristics of the aforementioned measuring device or measuring kit 1.

According to the method of the invention, the person wanting to develop a mail-order sales system for eyeglasses will create a website offering different eyeglasses. These eyeglass frames are shown on actual photographs or correlatively they are modeled (reproduction of the image of the actual eyeglass frame) in the manner of a sheet of tracing paper in a front view and in profile. These modeled frames are designated by the term "tracing" in the description and claims below.

The client experiencing vision problems goes to an ophthalmologist in order to determine the cause of his problems. The ophthalmologist writes him a prescription stating the diagnosed pathology and, if such is the case, indications prescribing eyeglasses with lenses with the appropriate optical characteristics.

This client then visits this website to order a pair of eyeglasses with lenses prescribed by an ophthalmologist.

The client indicates, on line, the frame model he or she desires and informs the supplier of the prescription issued by the ophthalmologist.

The website owner then sends, free of charge, an innovating measuring device 1, after the client has visited said website. The measuring device 1 comprises, on the one hand, an optical eyeglass template 2 featuring a face part 4 and temples 5, and on the other hand, a rhinometer 3 featuring the technical characteristics previously mentioned in the present description.

The client himself takes, or has a third person take two photographs, each of the shots having a role to play, be it in the adjustment of the frame in conformance with the client's face, be it in the mounting and cutting of the appropriate corrective lenses in the frame.

The client puts the template 2 on his face and takes the shots showing a photograph of his head in a front view (FIG. 7), taken at a distance of more than 2.5 m and a photograph of his head in profile (FIG. 8) taken at a distance of about 1 m.

The client also performs, with the rhinometer 3, the measurements of the value of the flare angle of his nose as well as the measurements of the width of the nose bridge, by effecting a direct reading of these values in order to model the shape of the client's nose, in particular in the area where the nose pads will touch the nose.

The website receives the order, the shots and the various directly read measurements sent by the client.

The website owner processes, or has this done under his control, the data sent by the client. This processing is done by means of software that has been configured so as to permit the analysis of the information transmitted by the client and the instructions given for the production of the eyeglasses in accordance with the client's selection and morphology.

Finally, the eyeglasses are produced on the basis of the information resulting from this processing.

According to an important characteristic of the method according to the invention, this processing done by means of the software comprises the following steps:

rescaling of the photographic shots of the client wearing the template 2, utilizing the markings 11 located in a predetermined manner on the face part 4 and the temples 5, said photo shots featuring a front view taken at no less than two and a half meters and a profile view taken at approximately one meter;

determination of the precise value of the pupillary distance (or of the two pupillary half-distances) relative to the virtual axis of symmetry of the template 2 and of the measurement of the distance between the centers of the pupils of each of the client's eyes derived from the markings 11 of the face part 3 of the template 2 on the rescaled front view and also utilizing the markings 11 located on the temples 5;

determination of the value of the optimal pupillary height utilizing the front and profile shots comprising:
overlay of the tracing of the frontal view of the frame selected by the client on the front view, these having been rescaled;

overlay of the tracing of the profile view of the frame selected by the client on the profile view, in order to confirm the proper position of the frame on the client's face, taking into account the position of the bridge of the chosen frame relative to the client's nose, the distances between the eye, the eyelids and the lenses;

evaluation of the value of the ideal pupillary height on the front view, this height corresponding to the distance between the bottom of the tracing of the frame and the pupillary axis.

Determination of the opening to provide for the tenons and temples based on the information collected from the face shot that has been rescaled by means of the marking 11 located on the face part 4 of the template 2, of the direction adopted by the client for the mounting of the temples 5 of the template 2 (wide-head or narrow-head position visible with the positions of the markings 17 of the tabs 14 of the fastening end 13 of the temples 5) and the overall dimension of the template 2;

Determination of the bending zone of the temples of the frame by means of the profile view that has been rescaled by utilizing the marking 11, of the tracing of the profile view of the chosen frame, of the distance between the bridge of the frame chosen by the client and a particularly characteristic cartilaginous fold of the ear visible on the profile shot;

The evaluation of this distance is made possible because of the temples 5 of the eyeglass template 2 which serves also as a scale.

Determination of the proper position of the nose pads comprising:
a reading of the distance between the bridge and the client's nose by means of the profile view and the profile tracing of the eyeglass frame chosen by the client;

a progressive adjustment of the nose pads of the chosen frame by positioning these eyeglasses on a "false nose" having the same width of the nose bridge and the same flare angle of the client's nose. The proper position of the nose pads is determined by the orientation, the tightening and by the plastic deformation of the arms of the nose pads, so as to ensure the flat fit of each nose pad on the two sides of a "false nose" produced earlier with the same characteristics (bridge width and flare angle) as those read on the rhinometer 3 supplied to the client.

By successive approaches the nose pads will be made perfectly parallel to the sides of the client's nose so as to ensure a comfortable fit of the frame on the wearer's nose. Incidentally, this adjustment assumes the constitution of a "false nose" to cover the range of possible combinations including each individual's characteristics, namely the bridge width and the flare angle of the nose.

Once these measurements have been taken, the website owner ships the ordered pair of corrective eyeglasses to the client.

The present invention concerns also eyeglasses produced by the implementation of the method and of the measuring device according to the previously described characteristics.

I claim:

1. Method enabling the remote production of eyeglasses, characterized in that it comprises the following steps:
creation of a website offering various eyeglass frames, these frames being correlatively modelized by informatics in the manner of a "tracing";

mailing, by the website owner, of a measuring device to the client after consultation of said site by the client, this measuring device comprising, on the one hand, a template of optical eyeglasses featuring a face part and temples and, on the other hand, a rhinometer;

taking, by the client, of photographs with the eyeglass template on his nose, these shots comprising a front view and a profile view;

measurement of the values of the width of the nose bridge and the flare angle of the nose utilizing the rhinometer and direct reading of these values in order to modelize the shape of the client's nose;

receipt by the website of the order, the shots and the various directly read measurements sent by the client;

processing, by the website owner or under his control, by means of software configured to enable the analysis of the information transmitted by the client and of the instructions given for the production of the eyeglass frame in conformance with the choice and morphology of the client;

production of the eyeglasses on the basis of the information resulting from this processing.

2. Method enabling the remote production of eyeglasses, as per claim 1, characterized in that the processing by the website owner or under his control, by means of said software comprised the following steps:

rescaling of the photographic shots of the client wearing the template utilizing markings located in a predetermined manner on the face part and on the temples, said shots featuring a front view and a profile view;

determination of the precise value of the pupillary distance (or of the two pupillary half-distances) relative to the virtual axis of symmetry of the template and of the measurement of the distance between the centers of the pupils of each eye of the client, derived from the markings of the face part of the template on the rescaled front view;

determination of the value of the optimal pupillary height utilizing the face and profile shots comprising:
overlay of the front view tracing of the frame chosen by the client on the face shot, these being rescaled;
overlay of the profile tracing of the frame chosen by the client on the profile shot in order to confirm the proper position of the frame on the client's face, taking into account the position of the bridge of the chosen frame relative to the client's nose, the distances between the eye, the eyelids and the lenses,
evaluation of the value of the ideal pupillary height on the face shot, this height corresponding to the distance between the bottom of the tracing of the frame and the pupillary axis;

determination of the opening to provide for the tenons and temples based on the information collected on the rescaled face shot utilizing the markings located on the face part of the template, of the direction adopted by the client for the mounting of the temples of the template (wide head or narrow head position) and of the total dimension of the template;

determination of the bending zone of the temples of the frame utilizing the rescaled profile view thanks to the markings of the tracing on the profile view of the chosen frame, of the distance between the bridge of the chosen frame chosen by the client and a particularly characteristic cartilaginous fold of the ear that is visible in the profile shot; and determination of the proper position of the nose pads comprising:
- a reading of the distance between the bridge and the nose of the client utilizing the profile shot and the tracing on the profile view of the frame chosen by the client; and
- a progressive adjustment of the nose pads of the chosen frame by positioning these eyeglasses on a 'false nose' that has the same width of the nose bridge and the same flare angle as the client's nose.

3. Measuring device comprising a rigid eyeglass template for implementation of the method as per claim 1, characterized in that the template is constituted by a face part, analog to an eyeglass frame, comprising two circles that are spaced and connected by a bridge, and on each side of which is or can be fastened, in a rigid and removable manner, a temple, and in that said face part of the template is provided with markings that are precisely positioned on the outside face of its two circles.

4. Measuring device as per claim 3, characterized in that each lateral edge of the face part comprises an oblong opening which is configured to receive, in a rigid and removable manner, the fastening end of a temple, the fastening end of each temple being shaped so enable its permutation with the other temple, so as to modify the spacing of the temples, thereby enabling an adaptation of the template to the morphology of the client's head (narrow head or wide head).

5. Measuring device as per claim 1, characterized in that the fastening end of each of the temples presents two rigid and flexible latching tabs positioned one opposite the other so as to enable the flush fitting of the temples into the face part, each tab having a tip with a beveled end to bring the tabs together when they pass into the oblong opening and with a large base to retain the tip outside of the oblong opening.

6. Measuring device as per claim 5, characterized in that the couple of latching tabs of the fastening ends is eccentric relative to the plane in which each temple is included so that the space separating the two temples when these are attached to the face part can be larger or less large or smaller or less small, depending on the left or right position occupied by each of the temples.

7. Measuring device as per claim 6, characterized in that one of the latching tabs of each fastening end of the temples includes a notch, the bottom of which features a marking, this marking being identifiable through said oblong opening so as to determine the wide-head or narrow-head position of a client and which is directly visible on the front view.

8. Measuring device as per claim 3, characterized in that the inside face of the face part includes a number of parallel slots, preferably situated above the oblong opening, these slots working together with a means of attachment provided in the upper portion of the fastening end of the temples, so that the position of the latter can be indexed upward or downward, by considering a vertical position of the eyeglass template worn by the client, and in that the height position of the temples can be seen through the oblong opening of said face part.

9. Measuring device (1) as per claim 3, characterized in that the outside and inside faces of the two temples are provided with markings distributed over their entire length or at least over the rear portion of said temples.

10. Measuring device as per claim 3, characterized in that the marking means comprises targets placed at a precise and predetermined distance from each other.

11. Measuring device as per claim 3, characterized in that each temple includes, in its connection portion to the face part of the template a horizontal displacement oriented downward, thereby laying free a large part of the face so as to make visible the essential characteristics of the eye and its surroundings.

12. Measuring device as per claim 3, characterized in that each temple includes, in its connection portion to the face part of the template, a marking located in alignment with the lower, rectilinear edge of the temple that is in contact with the client's ear.

13. Measuring device comprising a rhinometer for the implementation of the method as per claim 1, characterized in that said rhinometer features two parts which can slide one against the other, each of these parts having flanges featuring a slanted edge, the slanted edges of the flanges of one of the parts having an inclination that is inverse to that of the flanges of the other part, each flange of one of said parts forming with one flange of the other part a couple of flanges with variable spacing and where slanted edges form between them a variable angle so as to constitute a device for measuring the angle of the nose flare and the width of the nose bridge.

14. Measuring device as per claim 13, characterized in that the rhinometer features means which allow, on the one hand, to keep the parts close against each other, and, on the other hand, the guidance of these parts during their reciprocal axial movements.

15. Measuring device as per claim 13, characterized in that it includes a rear part and a face part and in that the rear part features on its front side a diagonal line which is visible through a diagonal slot inversely oriented from the face part, the diagonal slot having markings on its sides which constitute a measurement system.

16. Measuring device as per claim 13 characterized in that the rhinometer features several couples of flanges in the upper part and in the lower part of said rhinometer, each of these couples of flanges having a different angular value, so as to form a number of measuring means for the nose flare angle and the width of the nose bridge of the client.

17. Eyeglasses characterized in that they are produced by implementation of the method as per claim 1.

* * * * *